March 7, 1967 G. J. DUSHECK, JR 3,308,441

INFORMATION PROCESSING APPARATUS

Filed Sept. 6, 1963 9 Sheets-Sheet 1

INVENTOR.
GEORGE J. DUSHECK, Jr.
BY
Morris Rabkin
ATTORNEY

March 7, 1967 G. J. DUSHECK, JR 3,308,441

INFORMATION PROCESSING APPARATUS

Filed Sept. 6, 1963 9 Sheets-Sheet 2

INVENTOR.
GEORGE J. DUSHECK, Jr.
BY
Morris Rabkin
ATTORNEY

| | | CONTROL SETTINGS | | | |
|---|---|---|---|---|---|
| | DIGITAL LOGIC FUNCTION | W (38) | X (40) | Y (42) | Z (44) |
| a | $A=0, B=0$ | 0 | 0 | 0 | 0 |
| b | $\bar{A}\cdot\bar{B}=1$ | 0 | 0 | MAX. | 0 |
| c | $A\cdot\bar{B}=1$ | 0 | 0 | 0 | MAX. |
| d | $A\cdot B=1$ | 0 | MAX. | 0 | 0 |
| e | $\bar{A}\cdot B=1$ | MAX. | 0 | 0 | 0 |
| f | $\bar{B}=1$ | 0 | 0 | MAX | MAX. |
| g | $A=1$ | 0 | MAX. | 0 | MAX. |
| h | $A\cdot B+\bar{A}\cdot\bar{B}=1$ | 0 | MAX. | MAX. | 0 |
| i | $A\cdot\bar{B}+\bar{A}\cdot B=1$ | MAX. | 0 | 0 | MAX. |
| j | $\bar{A}=1$ | MAX. | 0 | MAX. | 0 |
| k | $B=1$ | MAX. | MAX. | 0 | 0 |
| l | $A+\bar{B}=1$ | 0 | MAX. | MAX. | MAX. |
| m | $\bar{A}+\bar{B}=1$ | MAX. | 0 | MAX. | MAX. |
| n | $\bar{A}+B=1$ | MAX. | MAX. | MAX. | 0 |
| o | $A+B=1$ | MAX. | MAX. | 0 | MAX. |
| p | $A+\bar{A}+B+\bar{B}=1$ | MAX. | MAX. | MAX. | MAX. |

Fig. 4.

INVENTOR.
GEORGE J. DUSHECK, Jr.
BY Morris L. Rabkin
ATTORNEY

March 7, 1967 G. J. DUSHECK, JR 3,308,441

INFORMATION PROCESSING APPARATUS

Filed Sept. 6, 1963 9 Sheets-Sheet 4

INVENTOR
GEORGE J. DUSHECK, Jr.
BY
Morris [signature]
ATTORNEY

March 7, 1967 G. J. DUSHECK, JR 3,308,441

INFORMATION PROCESSING APPARATUS

Filed Sept. 6, 1963 9 Sheets-Sheet 5

INVENTOR.
GEORGE J. DUSHECK, Jr.
BY
Morris Rabkin
ATTORNEY

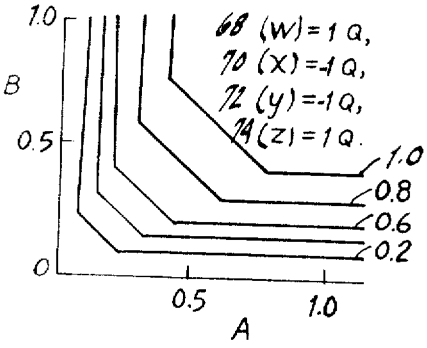
Fig. 8-a
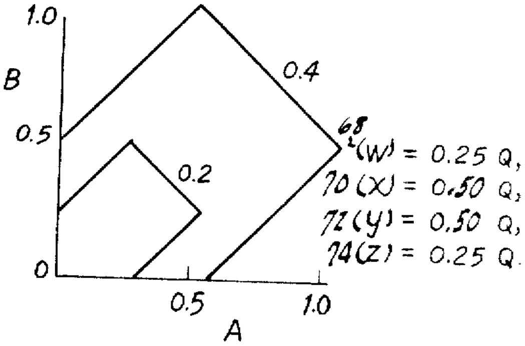
Fig. 8-d
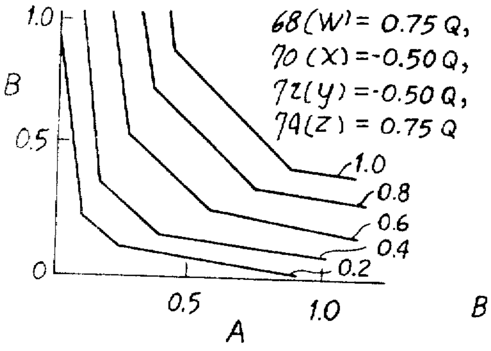
Fig. 8-b
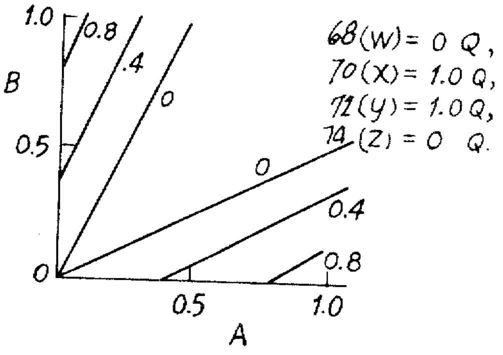
Fig. 8-e
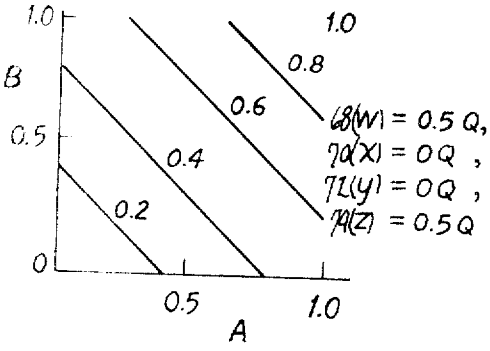
Fig. 8-c
INVENTOR.
GEORGE J. DUSHECK, Jr.
BY
Morris Rakin (signature)
ATTORNEY INVENTOR.
GEORGE J. DUSHECK, Jr.
BY
Morris Rabkin
ATTORNEY

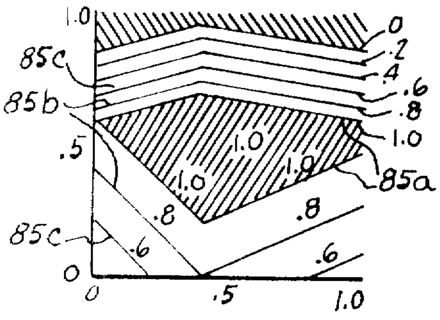
Fig. 11-a
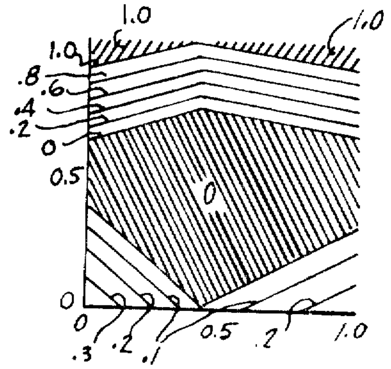
Fig. 11-b
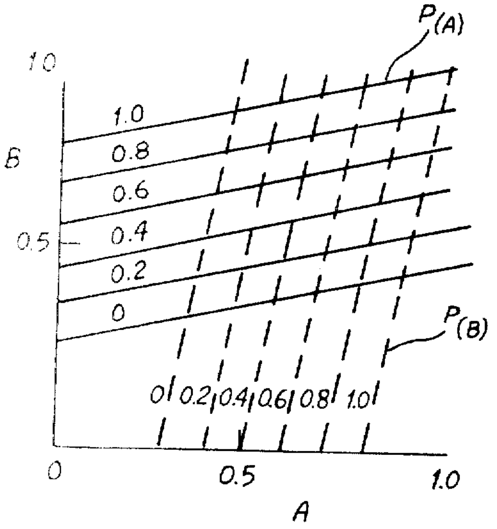
Fig. 12-a
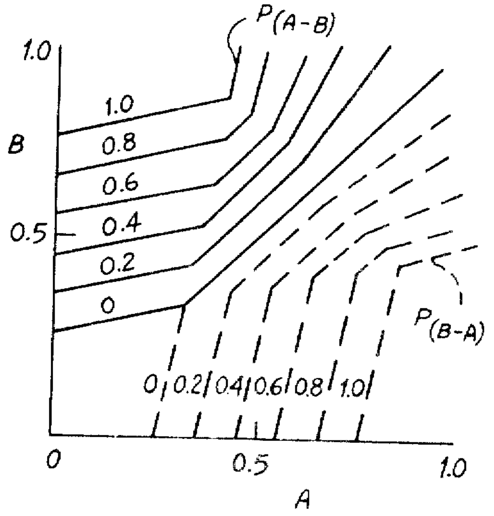
Fig. 12-b
INVENTOR.
GEORGE J. DUSHECK, Jr.
BY
[signature]
ATTORNEY March 7, 1967 G. J. DUSHECK, JR 3,308,441

INFORMATION PROCESSING APPARATUS

Filed Sept. 6, 1963 9 Sheets-Sheet 9

INVENTOR
GEORGE J. DUSHECK, Jr.
BY
Morris L. Rabkin
ATTORNEY

United States Patent Office 3,308,441

Patented Mar. 7, 1967

3,308,441

INFORMATION PROCESSING APPARATUS

George J. Dusheck, Jr., Riverton, N.J., assignor to Radio Corporation of America, a corporation of Delaware Filed Sept. 6, 1963, Ser. No. 307,185

16 Claims. (Cl. 340—172.5)

The present invention relates to information processing apparatus, and particularly to systems and networks for handling information by simulated neural processes.

The invention is especially suitable for use in artificial intelligence apparatus wherein information represented by electrical signals may be processed in accordance with various neural logic functions, for various purposes including the analysis and recognition of patterns, such as visual patterns and the sound patterns which exist in speech.

The biological nervous system is a highly efficient and powerful means for the processing of information A feature of the biological nervous system is its capability of responding to a wide range of stimuli. An analog, rather than a binary, response is provided by the biological nervous system. For example, a light is not only detected as being off or on, but the brightness of the light is perceived to vary from "dull" to "extremely bright"; the temperature of water is not merely felt to be hot or cold, but a range of temperatures from very cold to very hot is perceived. Moreover, the biological nervous system is capable of adapting to different conditions. Thus, response of the system may vary in an extremely hot or an extremely cold environment to accommodate for the level of heat or the level of cold which exists in the environment and to sense temperatures relative to that level. The biological nervous system may also be taught and may learn to adapt to certain conditions. Thus, a person may be taught to respond to the louder of two sound stimuli or to the difference in loudness of the two stimuli. Moreover, the response varies in an analog fashion continuously over a range and a person can continually evaluate the difference in loudness between two sounds and correct his actions accordingly.

Although the biological prototypes may not be duplicated exactly by means of artificial neural systems and networks, it is desirable to provide neural systems and networks having similar characteristics, for example, an analog response which varies over a range of a stimulus. It is also desired to simulate with neural systems and networks the adaptability of the biological nervous system to perform many different logic functions. Thus, adaptive neural systems and networks, which may be adapted to execute many logic functions, are desirable.

Different patterns may be recognized by adapting a neural logic system to perform different logic functions and thereby respond to significant features which characterize a certain pattern. Extensive work has been done in binary or digital logic systems. The presence and absence of features of a pattern can be recognized by such binary logic systems. In many cases, patterns are distorted or incomplete so that the presence and absence of each feature may not be correctly known or detected by a pattern recognition system which operates in accordance with binary logic. The biological nervous system is capable of recognizing patterns where the presence of each feature cannot be accurately determined, since the biological nervous system is capable not only of making a distinction between the absence and presence of a feature, but also of deciding whether or not a certain pattern represents a known pattern on the basis of the probability that selected features are more likely to be the requisite features of that known pattern.

It follows from the foregoing discussion that systems and networks which perform neural logic functions are characterized by outputs, analog in nature, which are a measure of the probability level of events which are represented by inputs to these networks and systems. Binary decisions may also be indicated by the output of these networks and systems, for example, at certain extreme values of the range of analog outputs which are produced. Thus, neural logic systems and networks perform similarly to the biological nervous system, since most biological nervous systems exhibit an analog performance range.

It is an object of the present invention to provide improved artificial intelligence apparatus which exhibits a performance similar to that of the biological nervous system.

It is a further object of the present invention to provide improved neural systems and networks capable of performing a range of neural logic functions.

It is a still further object of the present invention to provide improved neural logic networks capable of performing any of a plurality of neural logic functions which may be selected.

It is a still further object of the present invention to provide improved neural logic networks which can perform a continuous range of neural logic functions of input variables which, at the extreme values of these input variables, correspond to Boolean logic functions thereof.

It is a still further object of the present invention to provide improved neural networks which may be adapted to perform any of a plurality of neural functions.

It is a still further object of the present invention to provide an improved neural logic network which may be adapted to perform a plurality of neural logic functions readily with a small number of control operations.

Briefly described, a neural network embodying the invention includes at least three circuit neurons, each having an upper and lower threshold and each providing an output which is a function of inputs thereto which exceed the lower threshold and which increase in accordance with these inputs until the upper threshold is reached. Thereafter, the output reaches a saturation level. Inputs to the third of the neurons are functions of different combinations of the inputs to the first and second of the neurons, signals of opposite sense to these inputs, and the outputs of the first and second neurons. The degree of efficacy of these inputs may be controlled, as by controlling their levels, thereby obtaining, for different levels of each of the inputs to the third neuron, an output from the third neuron which may satisfy the different selected neural logic functions of the inputs to the network.

The invention itself, both as to its organization and method of operation, as well as additional objects and advantages thereof, will become more readily apparent from a reading of the following description in connection with the accompanying drawings, in which:

FIG. 4 is a table indicating the settings of variable weighting elements in the network of FIG. 3 to provide different neural logic functions;

Figure 3:
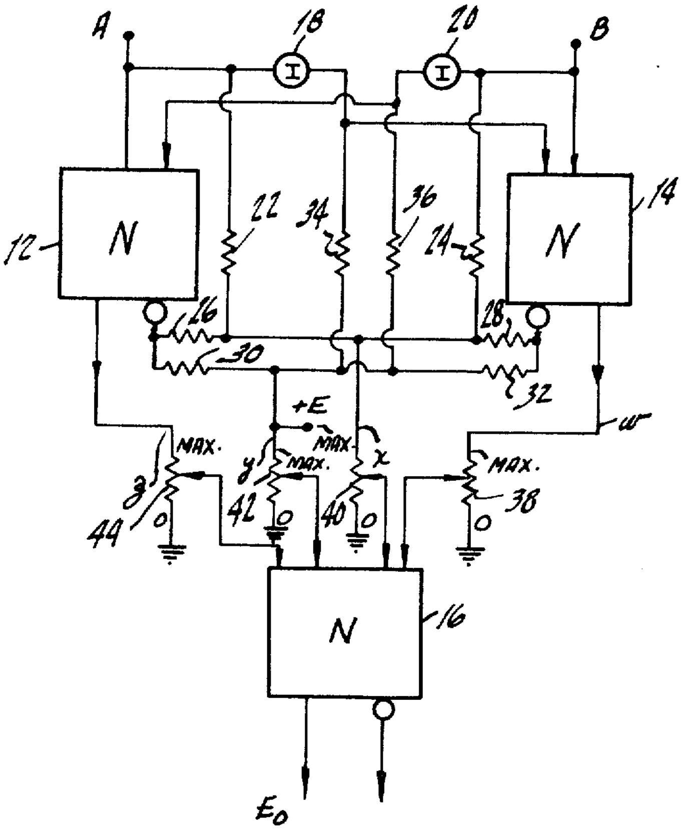
FIG. 3 is a diagram, partially schematic and partially in block form, of a neural network.
Figures 5A, 5B, 5C, 5D, 5E, 5F, 5G, 5H, 5I, 5J, 5K, 5L, 5M, 5N, 5O, 5P:
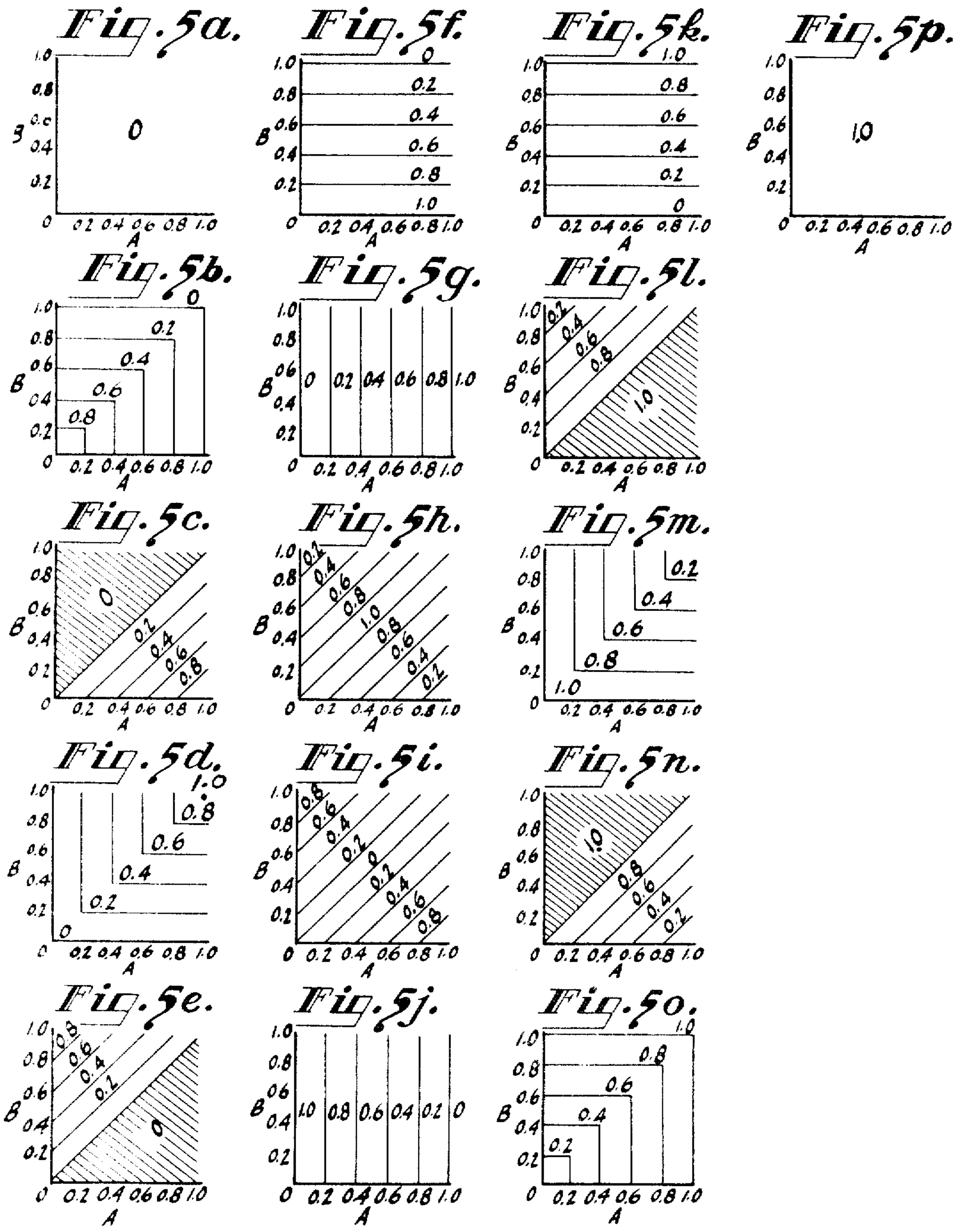
Figure 6:
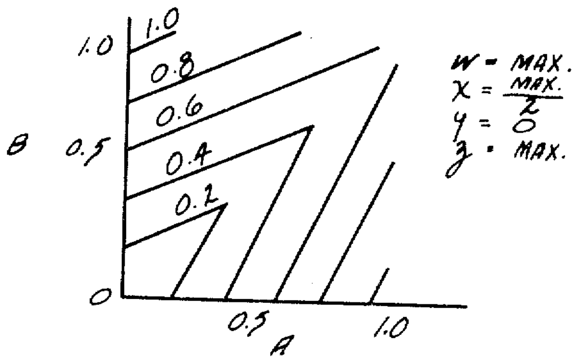
Figure 7:
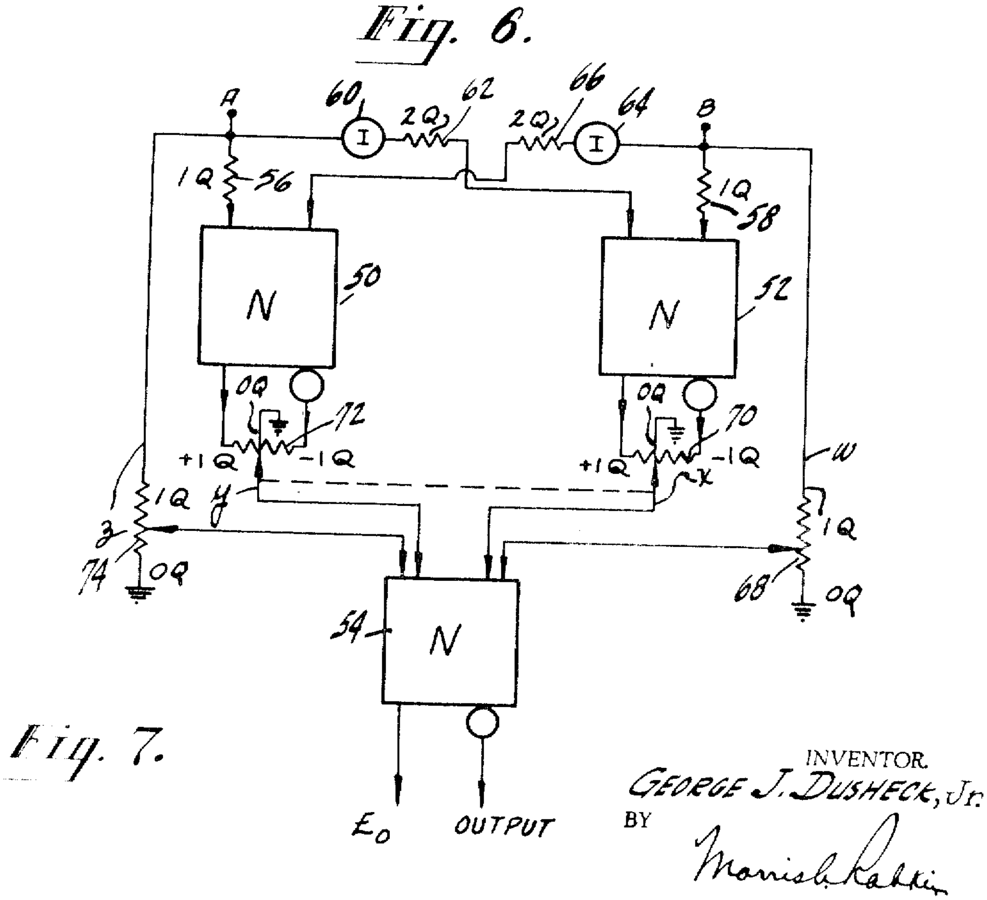
Figures 9, 10:
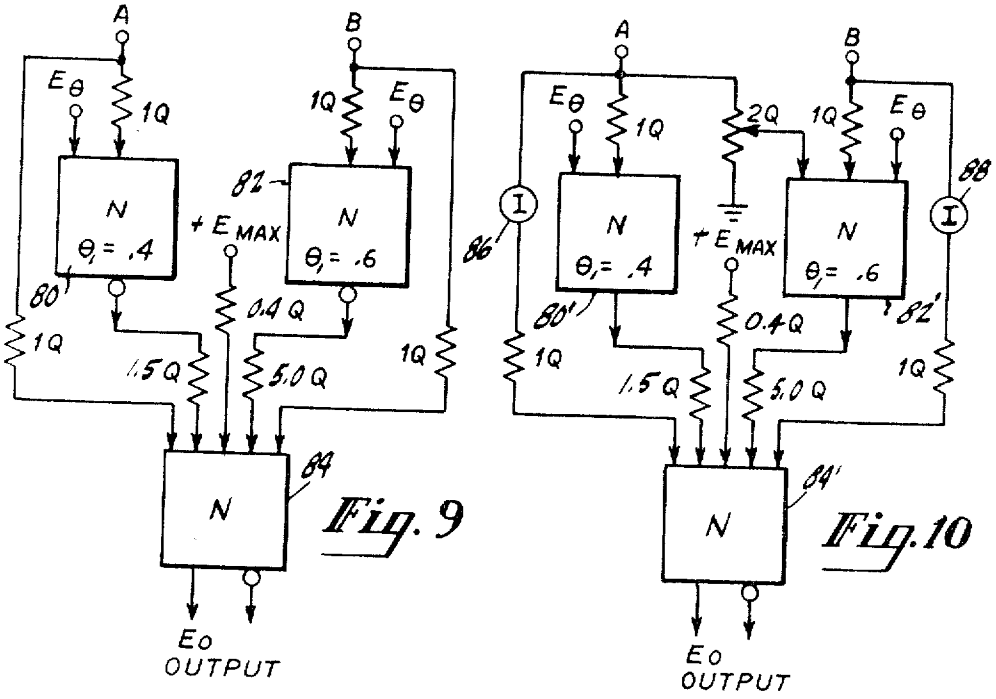
Figure 14:
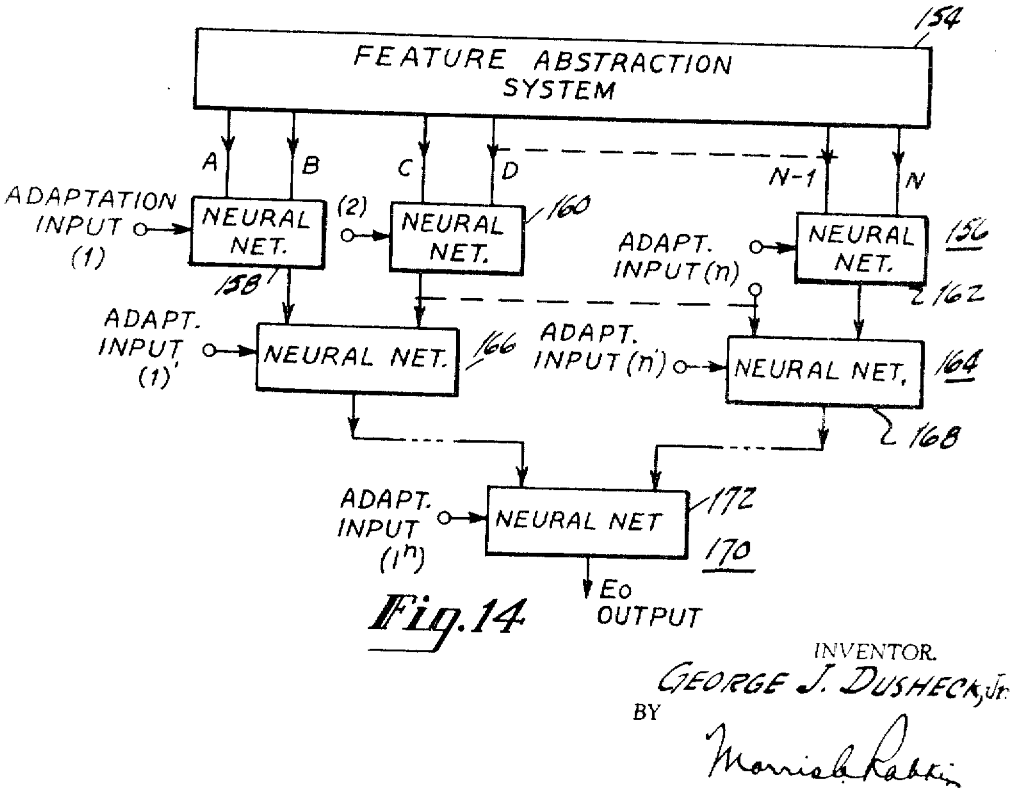
Figure 13:
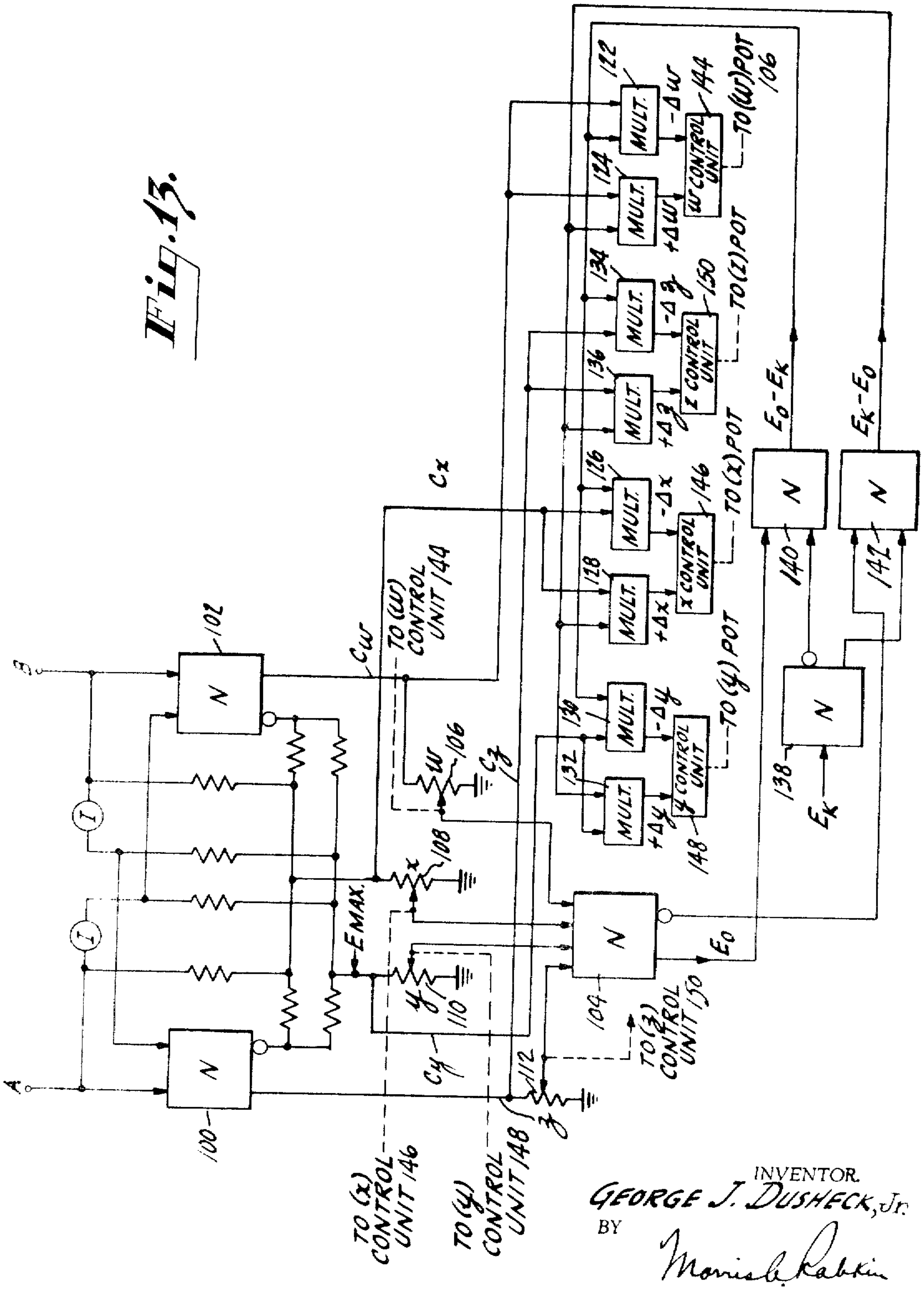

FIG. 5*a* to FIG. 5*p*, inclusive, are curves illustrating the response characteristics of the network of FIG. 3 which correspond to the logic functions given in the table of FIG. 4;

FIG. 6 is a curve illustrating another response characteristic of the network of FIG. 3;

FIG. 7 is a diagram, partially schematic and partially in block form, showing another neural logic network;

FIGS. 8*a* through 8*e*, inclusive, are curves showing response characteristics obtainable with the network shown in FIG. 7;

FIG. 9 is a diagram, partially schematic and partially in block form, of another neural network which is capable of providing a peak output;

FIG. 10 is a diagram, partially schematic and partially in block form, of another neural network which is capable of providing a minimum within a range of inputs;

FIGS. 11–*a* and 11–*b* are curves respectively illustrating the response characteristics of the networks shown in FIGS. 9 and 10;

FIG. 12–*a* is a curve showing the probability characteristics of two events as a function of two variables; and FIG. 12–*b* is a curve showing the probability characteristic of the presence of one of the events in the presence of the other, and vice-versa, also as a function of these two variables;

FIG. 13 is a diagram, partially schematic and partially in block form, of a system which may be automatically adapted to perform various different logic functions; and FIG. 14 is a block diagram of a pattern recognition system incorporating a plurality of adaptive neural networks, such as illustrated in FIG. 13.

Figure 1:
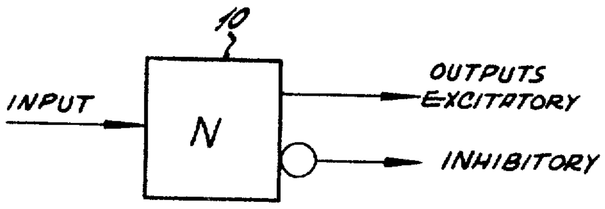
FIG. 1 is a block diagram which represents a basic neuron circuit.

Referring more particularly to FIG. 1, there is shown a circuit neuron 10 indicated as a block inscribed with the letter "N." An input is applied to the neuron 10. The input may be an electrical signal which varies in amplitude and which may be related to an event such as sound, light or other radiant energy, or the like. The event may be translated into the form of an electrical signal by means of a suitable transducer. Two outputs are derived from the neuron 10, one being an excitatory output and the other an inhibitory output. The inhibitory output is designated by a circle juxtaposed against the output side of the neuron 10, a lead extending from the circle. The excitatory and inhibitory outputs are of opposite sense, the excitatory output being polarized in one sense, say, positively, while the inhibitory output is polarized in the opposite sense, say, negatively. The circuit neuron 10 may be of the type described in United States Patent No. 3,097,349, issued July 9, 1963, to Franz L. Putzrath and Thomas B. Martin. The neuron described in this Putzrath and Martin patent provides outputs in the form of a train of pulses which may be translated into direct current signals, related in amplitude to the repetition rate of the pulses in the train by integrating circuits in the input side of the neuron. Integrating circuits may be included in the output side of the neuron 10 for translating trains of pulses generated in the neuron 10 into direct current voltages, and the excitatory and inhibitory outputs of the neuron may be direct current voltages respectively of positive and negative polarity. For the sake of convenience of explanation, it will be assumed that suitable integrating circuits are incorporated in the output sides of the neuron 10 and that the excitatory and inhibitory outputs thereof are direct current voltages respectively of positive and negative polarity.

Figure 2:
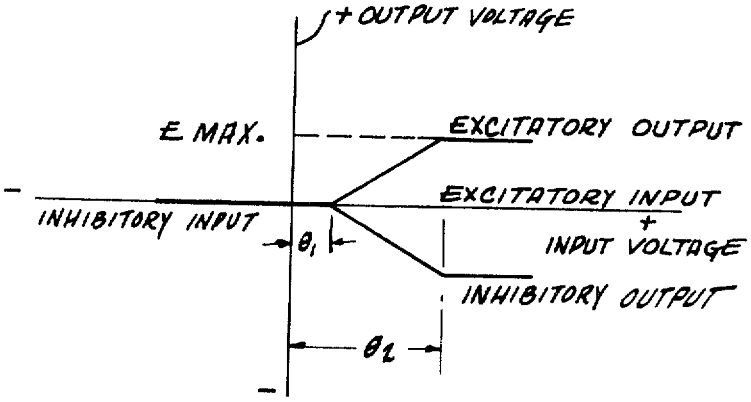
FIG. 2 is a curve representing the characteristics of the neuron circuit shown in FIG. 1.

FIG. 2 illustrates the input-output characteristics of the neuron 10. While a single input line through the neuron is shown in FIG. 1, it will be appreciated that a plurality of input lines may be provided so that a plurality of inputs, which are either excitatory or inhibitory, may be applied thereto. As explained in the Putzrath and Martin patent, the neuron 10 includes a summation circuit which combines these excitatory and inhibitory inputs. As indicated on the abscissa of the curve of FIG. 2, the excitatory inputs are positive in polarity and the inhibitory inputs are negative in polarity. The characteristics of the neurons are such that an output is not provided unless the neuron is excited by a net excitatory input voltage which exceeds a threshold $\theta_1$. The outputs of the neuron increase linearly with increasing excitatory input voltages until an upper threshold $\theta_2$ is reached, whereupon the output voltages saturate and remain at a constant level indicated as $E_{MAX}$.

FIG. 3 illustrates a neural network incorporating three circuit neurons 12, 14 and 16, similar to the circuit neuron 10 (FIG. 1). This neuron network is capable of being adapted to provide an output which may satisfy a continuous range of neural logic functions of two variables indicated as input A and input B. These inputs are assumed, for purposes of illustration, to be direct current signals of positive polarity which vary in amplitude and are therefore excitatory in nature. Since inhibitory input signals corresponding to inputs A and B are used in the network of FIG. 3, inverter circuits 18 and 20, which are connected to the terminals to which the inputs A and B are applied, invert the polarity of the signals to provide inhibitory inputs. The inverters 18 and 20 may be unnecessary should negative polarity signals corresponding to the inputs A and B be available, say from the outputs of other neurons which provide the inputs A and B. An inhibitory input corresponding to input A is applied to the neuron 14 and an inhibitory input corresponding to input B is applied to the other neuron 12. The neuron 12 then provides outputs which are functions of the difference between inputs A and B, while the neuron 14 provides outputs which are functions of the difference between inputs B and A. When input B exceeds input A in amplitude, the neuron 12 is inhibited so that only the neuron 14 provides outputs. The neuron 14 is inhibited when input A exceeds input B so that only the neuron 12 will provide an output.

Different combinations of the excitatory and inhibitory outputs of the neurons 12 and 14 and of the excitatory and inhibitory inputs A and B provide inputs to the third neuron 16. Four combinations or groups $w$, $x$, $y$ and $z$ of the excitatory and inhibitory inputs A and B and the excitatory and inhibitory outputs of the neurons 12 and 14 are developed. The input $w$ is derived from the excitatory output of the neuron 14 and is related to the difference between the input B and the input A, or (B−A). This input $w$ does not appear when the input A exceeds the input B.

The next input $x$ is a function of the sum of selected signals derived from the input A through a resistor 22; the input B through a resistor 24; the inhibitory output of the neuron 12 through a resistor 26; and the inhibitory output of the neuron 14 through a resistor 28. Suitable values of the resistors 22, 24, 26 and 28 are chosen to attenuate the signals transmitted to a potentiometer resistor 40 by one-half. Since the inhibitory output of the neuron 12 is related to the negative value of the difference between the input A and the input B when input A is larger than input B, and since the inhibitory output of the neuron 14 is related to the negative value of the difference between the input B and the input A when input B is larger than input A, input $x$, which is the function of the sum of these inhibitory outputs and the excitatory inputs A and B, is proportional to the input B when input A is greater than input B, and is proportional to the input A when input B is greater than input A.

Input $y$ is also a function of the sum of selected signals derived from the inhibitory output of the neuron 12 through a resistor 30; the inhibitory output of the neuron 14 through a resistor 32; the inhibitory input A through a resistor 34; and the inhibitory input B through a resistor 36. The resistors 30, 32, 34 and 36 are chosen similarly to the resistors 22, 24, 26 and 28 to attenuate signals transmitted to a potentiometer resistor 42 by one-half. When the potentiometers 40 and 42 have the same overall resistance, all the resistors 22, 24, 26, 28, 30, 32, 34 and 36 may be of equal value. Another voltage having a value $E_{MAX}$ equal to the excitatory output of a neuron which is provided when its upper threshold $\theta_2$ is exceeded (see FIG. 2) is also combined with the inputs mentioned above in this paragraph to provide the input $y$. This voltage $E_{MAX}$ may be obtained from a source connected to the potentiometer 42 through an isolating resistor (not shown). The input $y$ is a function of the sum of the inputs mentioned above in this paragraph and the signal voltage level $E_{MAX}$. Accordingly, the input $y$ is proportional to the difference between $E_{MAX}$ and the input A ($E_{MAX}-A$), when input A is greater than input B, and the difference between the voltage $E_{MAX}$ and input B ($E_{MAX}-B$), when input B exceeds input A.

The fourth input $z$ is derived directly from the excitatory output of the neuron 12 and therefore is proportional to the difference between input A and input B ($A-B$), when input A is greater than input B. The summations of the signals, which provide the inputs $w$, $x$, $y$ and $z$ to the neuron 16, are accomplished by means of four weighting elements in the form of potentiometer resistors 38, 40, 42 and 44. One end of these resistors is grounded, while the other ends are connected respectively to terminals to which the various different combinations of outputs and inputs mentioned above are applied. Thus, when the sliders of these potentiometers are in their upper positions, they do not attenuate their respective combinations of signals. These upper settings are indicated as the maximum (MAX.) control settings of the weighting element potentiometers 38, 40, 42 and 44. When the sliders of these potentiometers are connected to ground, the inputs are completely attenuated and do not contribute to the excitation or inhibition of the neuron 16. These minimum control settings are each designated by a zero (0) at the grounded side of the potentiometers 38, 40, 42 and 44 in FIG. 3.

Since the amount of attenuation introduced by the weighting element potentiometers 38, 40, 42 and 44 is continuously variable, the network shown in FIG. 3 can perform a continuous range of neural logic functions. This range of functions may be expanded if the thresholds, and particularly the lower threshold $\theta_1$, of the neurons 12, 14 and 16 are varied by applying different values of negative voltage to their inputs. The excitatory output of the neuron 16, indicated as $E_0$ in FIG. 3, is a measure of the satisfaction of a continuous range of neural logic functions of the two inputs A and B, which can be performed by the network shown in FIG. 3. The network may be adapted to satisfy almost any desired logic function of the two inputs A and B. Thus, it is a singularly flexible neural logic network.

Assume that the lower thresholds $\theta_1$ of the neurons 12, 14 and 16 are set to zero. The weighting element potentiometers may be set to their extreme values, either maximum or zero attenuation. For extreme values of the inputs A and B, either of maximum value, which exceeds the upper threshold $\theta_2$ of the neurons, or zero value, the network then satisfies any of the sixteen possible digital or Boolean logic functions of these inputs A and B. These sixteen possible Boolean logic functions are indicated as "$a$" through "$p$," inclusive, in the chart of FIG. 4. This chart also designates the settings of the weighting element potentiometers 38, 40, 42 and 44 for obtaining these sixteen Boolean logic functions $a$ to $p$.

It will be appreciated that the output $E_0$ is an analog function of the inputs A and B. Accordingly, when the weighting element potentiometers are set as specified in the chart of FIG. 4, the output $E_0$ is a continuous function of the inputs A and B throughout the range thereof from their extreme to zero values.

The input-output relationships for the network of FIG. 3, when the weighting element potentiometers are set to satisfy the Boolean logic functions $a$ to $p$, are respectively illustrated in FIGS. 5$a$ to 5$p$. The inputs A and B are designated in normalized form and the values one (1.0) and zero (0) designate the extreme values of these inputs A and B. The contours represent different equal values of the output $E_0$ of the network for different values of the inputs A and B. Unlike digital or binary threshold logic, the neural logic network of FIG. 3 provides an output signal $E_0$ which varies over a continuous range throughout the range of the two inputs A and B.

The operation of the neural logic network of FIG. 3 may be understood by considering the signal flow through the network when it is set to satisfy the binary AND function (see line $d$ on FIG. 4 and FIG. 5$d$). The input A excites the neuron 12 as much as it inhibits the neuron 14, and the input B excites the neuron 14 as much as it inhibits the neuron 12. Therefore, as long as the inputs A and B are equal to each other, both the neurons 12 and 14 will be inhibited from providing outputs. Whenever input A is larger than input B, the neuron 12 will provide an inhibitory output proportional to its net excitation ($A-B$). Since the weighting element potentiometers 38, 42, and 44 are set to zero and completely attenuate the inputs $w$, $y$ and $z$, only the input $x$ is effective. Therefore, when input A equals input B, the output $E_0$ will be proportional to the sum of the inputs A and B. When input A is greater than input B, the output $E_0$ will be proportional to input B alone; and when input B is greater than input A, the output will be proportional to input A alone. These input-output relationships are illustrated by the curves of FIG. 5$d$. No output is produced when input A or input B alone is present.

FIG. 6 illustrates one of many possible neural logic functions intermediate the functions illustrated in FIGS. 5$a$ to 5$p$, which may be obtained by different settings of the weighting element potentiometers 38, 40, 42 and 44. The exemplary logic function is mid-way between the OR and the EXCLUSIVE OR logic functions illustrated in FIGS. 5$o$ and 5$i$ respectively. To obtain this function, the control potentiometers 38 and 44 are set to maximum values so that the inputs $w$ and $z$ are not attenuated. The potentiometer 42 is set at zero, thereby eliminating input $y$ and the control potentiometer 40 is set at its mid-point, thereby attenuating the input $x$ to one-half its value. Similarly, other combinations of weighting element potentiometer settings will provide different neural logic functions throughout a continuous range of neural logic functions, including the functions illustrated by the curves of FIG. 5.

Another neural logic network which may be adapted to provide a continuous range of neural logic functions is shown in FIG. 7. This network also includes three circuit neurons 50, 52 and 54 which may be similar to the circuit neuron 10 described in connection with FIGS. 1 and 2. Two inputs A and B, which are in the form of positive signal voltages, are respectively applied through resistors 56 and 58 to the first two neurons 50 and 52. These resistors 56 and 58 are indicated as having one unit of admittance (1Q). The resistors 56 and 58 may therefore be of equal resistance value, for example, 100 kilo-ohms. This value of resistance will depend upon the input resistance of the neurons 50, 52 and 54 and is selected solely to facilitate the illustration and as a value of resistance suitable when neuron circuits of the type described in the above-mentioned patent issued to Putzrath and Martin are used. The input A is inverted in an inverter circuit 60 and transmitted as an inhibitory input to the neuron 52 through a resistor 62 having twice the admittance (2Q) of either of the resistors 56 and 58. Similarly, the other input B is applied as an inhibitory input to the first neuron 50 after passing through an inverter 64 and after being attenuated by a resistor 66, also having an admittance twice that of either of the resistors 56 and 58 (2Q). The inverters 60 and 64 are unnecessary when complements of the inputs A and B are available. The inhibitory inputs through the neurons 50 and 52 are therefore twice the value of the excitatory inputs thereto. The neuron 50 is excited only if input A is twice as great as input B. Similarly, the other neuron 52 is excited only if input B is twice as great as input A.

Different combinations $w$, $x$, $y$ and $z$ of the excitatory and inhibitory inputs and outputs are applied as inputs to the third neuron 54. The input $w$ is equal to the input B. The input $x$ is selectively related either to the excitatory or to the inhibitory output of the neuron 52. The input $y$ is related either to the excitatory or to the inhibitory output of the neuron 50, with the restriction that the inputs $x$ and $y$ are simultaneously excitatory and inhibitory and also of equal value to each other. The input $z$ is equal to the input A. The input $w$ is applied to one end of a variable weighting element in the form of a potentiometer 68. The slider of the potentiometer 68 is connected to the input of the neuron 54. The potentiometer has a total admittance 1Q. By varying the position of the tap on the potentiometer, the input $w$ can be varied in level. Thus, when the potentiometer 68 is set at maximum level, indicated as 1Q on the potentiometer 68, the input $w$ is not attenuated, and when the slider of the potentiometer is set at the lowermost or ground level, indicated in FIG. 7 as 0Q, the input $w$ is completely attenuated and does not excite the neuron 54. Various intermediate values of attenuation between 0Q and 1Q are also obtainable by changing the position of the slider on the potentiometer 68.

The input $x$ is obtained at the slider of a potentiometer 70, the ends of which are connected between the excitatory and inhibitory outputs of the neuron 52. This potentiometer 70 is grounded at its mid or 0Q point. The input $x$ is respectively excitatory or inhibitory when the slider of the potentiometer is on opposite sides of the mid or 0Q point. Another potentiometer 72, similar to the potentiometer 70, is connected between the excitatory and inhibitory outputs of the neuron 50. The mid or 0Q point of this potentiometer 72 is also grounded and the $y$ input obtainable at the slider of the potentiometer is respectively inhibitory or excitatory when the slider is on opposite sides of the 0Q point. Since the inputs $x$ and $y$ are positive signals, when the sliders of the potentiometers 70 and 72 are on the excitatory output sides of their grounded center taps, the excitatory sides of the potentiometers 70 and 72 are designated by +Q values. Similarly, the inhibitory sides of the potentiometers are designated by −Q values. The potentiometers 70 and 72 are ganged so that the inputs $x$ and $y$ are simultaneously both inhibitory or both excitatory and the same amounts of attenuation are effective in the outputs of the neurons 50 and 52. A variable weighting element in the form of a potentiometer 74, similar to the potentiometer 68, is used to apply the input $z$ to the neuron 54. The potentiometers 68 and 74 may be ganged, if desired. Thus, only two controls need be exercised to adopt the network. The output $E_0$ of the neuron 54 is a measure of the satisfaction of the logic function which the network is adapted to perform.

By varying the settings of the potentiometers 68, 70, 72 and 74, a continuous range of neural logic functions can be provided. Selected for purposes of illustration are the neural logic functions which range between those essentially corresponding to the Boolean AND function and the Boolean EXCLUSIVE OR function. The response or transfer characteristics of the network, when set to perform various of these functions, are illustrated in FIGS. 8*a* to 8*e*. The settings of the potentiometers 68, 70, 72 and 74, which respectively selectively attenuate the inputs $w$, $x$, $y$ and $z$ so as to provide the characteristics shown in respective ones of the FIGS. 8*a* to 8*e*, are given in tables adjacent these figures. When the potentiometers of the network of FIG. 7 are set as specified in FIG. 8*a*, the network performs the neural logic function which corresponds to the Boolean AND function. FIG. 8*e* gives the potentiometer settings and illustrates the characteristics of the network of FIG. 7 for performance of the neural logic function corresponding to the Boolean EXCLUSIVE OR function. Functions intermediate the Boolean AND and EXCLUSIVE OR functions are illustrated in FIGS. 8*b*, 8*c* and 8*d*. The curves of FIGS. 8*a* to 8*e* are similar to those of FIG. 5 in that the values of the inputs A and B are normalized. The characteristics shown in FIG. 8*a* and FIG. 8*e* for the functions equivalent to AND and EXCLUSIVE OR differ somewhat from the corresponding characteristics of the network of FIG. 3 respectively illustrated in FIG. 5*d* and FIG. 5*i*. This difference in corresponding response characteristics is due in large part to the difference in the value of the inhibitory signals and the excitatory signals A and B which are applied to the neurons 50 and 52 in the network of FIG. 7. The excitatory and inhibitory signals applied to the neurons 12 and 14 of the network shown in FIG. 3 are equal to each other. Thus, by varying the excitatory and inhibitory effectiveness of the inputs to these networks, a control over their outputs is obtainable.

The network of FIG. 7 may be adapted to provide a continuous range of input signals by varying the settings of the potentiometers 68, 70, 72 and 74. The characteristics may also be altered by changing the relative values of the excitatory and inhibitory signals A and B. However, the primary control over the logic functions which can be performed by the network of FIG. 7 is due to the variable weighting element potentiometers 68, 70, 72 and 74.

FIG. 9 illustrates a neural logic network which provides a maximum or "peak" output when two inputs A and B are at selected levels within a certain range. Thus, the network of FIG. 9 provides an output which is a function of the probability that two events, represented by the inputs A and B, are within a certain range of interest. The events and their ranges of interest may, for example, be (1) light or other radiant energy outputs derived from a pattern to be recognized over a range of intensity, or (2) sound signals over a range of frequency, as in speech recognition.

The network of FIG. 9 includes three circuit neurons 80, 82 and 84, which are similar to the neurons described in connection with FIGS. 1 and 2. The neurons 80 and 82 have input signals $E_\theta$ applied thereto. These inputs may be obtained from sources of negative voltage and may be used to effectively raise the lower threshold $\theta_1$ of the neurons by requiring the excitatory inputs to these neurons 80 and 82 to exceed an effective threshold established by the input $E_\theta$ as well as the threshold built into the neuron. In the neural network of FIG. 9, these thresholds are set relatively high as compared to the signal level of the inputs and at the limits of the range at which the maximum response is desired. The inputs A and B are applied through resistances which may have an admittance value designated as 1Q. This value may correspond to 100 kilo-ohms, for example, when neurons of the type mentioned in the aforementioned Putzrath and Martin patent are used. Only the inhibitory outputs from the neurons 80 and 82 are used as inputs to the third neuron 84. These inhibitory inputs are attenuated by resistors which have admittance values of 1.5Q and 5.0Q respectively. Also supplied to the third neuron 84 are the inputs A and B. However, these inputs are attenuated by resistors having admittances of 1Q which are much lower than the admittances in the inputs to the neuron 84 which are derived from the inhibitory outputs of the neurons 80 and 82. Another input to the neuron 84 is provided which is a voltage equal to $+E_{MAX}$, which, as explained in connection with FIG. 2, is equal to that excitatory output which would be obtained from a neuron having an input signal applied thereto larger than its upper threshold $\theta_2$. This input $E_{MAX}$ is attenuated by a large resistor of admittance 0.4Q and applied to the neuron 84. This input $E_{MAX}$ causes the network to provide an output, even though no inputs A and B are present, since there is always a finite probability that an event may occur even though the inputs ordinarily characteristic of that event are absent. The inputs to the neuron 84 which are derived from the preceding neurons 80 and 82, when their threshold are exceeded, are less attenuated than the inputs A and B which are applied to that neuron 84.

FIG. 11–*a* illustrates the transfer characteristic of the network of FIG. 9. The normalized values of the output voltage $E_0$ is 1.0 for the innermost area 85 and the innermost bounding curves 85*a*, 0.8 for the curves next to the innermost curves, and 0.6 for the outermost curves. Consider the application of inputs A and B to the network of FIG. 9, which inputs increase in value. The output $E_0$ increases due to the application of the inputs A and B through the resistors of admittance 1Q to the inputs of the neuron 84. As soon as the inputs A and B exceed 0.4 or 0.6, which are the thresholds $\theta_1$ of their respective neurons 80 and 82, inhibitory outputs are applied from these neurons 80 and 82 to the inputs of the neuron 84. The strength of these inhibitory outputs increases more rapidly than the strength of the excitatory inputs to the neuron 84 due to inputs A and B. Accordingly, there is a rapid decrease in the output for input signals which exceed the thresholds $\theta_1$ and $\theta_2$. The result is that the output of the network reaches a "peak" for values of the inputs A and B about 0.4 and 0.6, respectively. The thresholds $\theta_2$ of the neurons 80 and 82 may be selected at any desired level corresponding to the probability of occurrence of events represented by the inputs. Thus, the output $E_0$ of the network can be a measure of such probability distributions as have a "peak" range of values.

The network of FIG. 10 is similar, in some respects, to the network of FIG. 9 and like parts are identified by like, primed reference numbers. The inputs to the third neuron 84' due to the inputs A and B are inhibitory since the inputs A and B pass through inverters 86 and 88 connected between the input A and the input to the neurons 80' and 82' provide inputs to the third neuron 84', respectively. Also, the excitatory outputs of the neurons 80' and 82' provide inputs to the third neuron 84'. The resulting characteristic is illustrated in FIG. 11–*b* wherein a minimum or "valley" response characteristic is obtained. The neuron 84' nominally is excited by the input $+E_{MAX}$ and provides an output $E_0$. This output decreases as the inhibitory inputs A and B increase. When inputs A and B exceed the thresholds 0.4 and 0.6 of the neurons 80' and 82', respectively, these neurons 80' and 82' excite the neuron 84' to an extent which overcomes the inhibitory effect of the inputs A and B, and the output $E_0$ no longer decreases. The input A may also be applied to the neuron 82' by way of a potentiometer 90. In this case, the region of the bottom of the "valley" response may be shifted so as to occur for lower values of the input B, since the input A aids the input B.

FIGS. 12–*a* and 12–*b* illustrate certain advantages in pattern recognition of the neural logic networks which were described above in connection with FIGS. 3 to 11. In FIG. 12–*a*, the family of curves labelled $P_{(A)}$ is the probability distribution of a feature of a pattern, for example, the distribution of the vowel sound "e" based upon two events A and B, which may correspond to the outputs of different frequency selective filters of a speech analysis system. The use of frequency selective filters to abstract the features of speech patterns is known in the art. (See United States Patent No. 2,971,058, issued to H. F. Olson and H. Belar, on February 7, 1961.) Another family of dashed line curves labelled $P_{(B)}$ in FIG. 12–*a* may represent the probability distribution of another speech sound (e.g., the "u" vowel sound) which may exist in the same speech pattern as the "e" sound. This probability distribution $P_{(B)}$ of the "u" sound is also based on the outputs A and B from the same frequency selective filters as the probability distribution $P_{(A)}$ for the "e" sound. These probability distributions may be obtained by analysis of a number of voicings of different sounds, such as speech syllable sounds which contain both "e" and "u" sounds.

The recognition of an unknown speech sound required differentiation between the "e" sound and the "u" sound, among other sounds, as well as among each other. The obtaining of outputs, such as A and B, from different frequency selective filters can isolate the "e" sound and the "u" sounds from most other sounds, for a given range of outputs A and B from these filters. It remains, however, to decide, based upon the A outputs and the B outputs, whether or not a pattern sound is an "e" sound or a "u" sound.

Since FIG. 12–*a* represents the probabilities of occurrence of the "e" sound and of the "u" sound, at all points within the given range of the inputs A and B, a basis for the recognition of one sound in the presence of the other can be derived analytically. The correspondingly valued curves of each family $P_{(A)}$ and $P_{(B)}$ which measure the probabilities of occurrence of a "u" sound and the probability of occurrence of an "e" sound may be subtracted from each other. The results of this analysis are plotted in FIG. 12–*b*, wherein the probability of occurrence of an "e" sound in the presence of a "u" sound is illustrated in the family of solid line curves $P_{(A-B)}$, while the probability of occurrence of a "u" sound in the presence of an "e" sound is represented by the dashed line curves $P_{(B-A)}$.

The responses of the above-described neural logic networks may be adapted to simulate either the probability distribution $P_{(A-B)}$ or $P_{(B-A)}$. In the case of the neural logic network shown in FIG. 3, the weighting element potentiometers 38, 40, 42 and 44 may be set initially in accordance with the chart of FIG. 4 to provide the characteristic shown in FIG. 5, which most closely approximates the desired one of the characteristics $P_{(A-B)}$ illustrated in FIG. 12–*b*. It will be noted that the characteristics of FIG. 5*e* are most similar. Then, the inputs, for example, *z* and *x*, may be increased by reducing the attenuation introduced by the weighting element potentiometers 40 and 44, *z* somewhat more than *x*, until the characteristic of FIG. 5*e* is modified to approach the characteristic representing the function $P_{(A-B)}$ of FIG. 12–*b*. The threshold $\theta_1$ of the neurons 12 and 14 may also be varied if a fine adjustment is desired. When inputs A and B derived, for example from the frequency selective filters of a speech analysis system are applied to the neural network, which is adapted as set forth above, the output $E_0$ of the third neuron of that network will be a measure of the occurrence of an "e" sound in the presence of "u" sounds.

Neural logic networks of the type described above may be adapted automatically to perform specified logic functions such as the probability distribution illustrated in FIG. 12–*b*.

FIG. 13 illustrates a system whereby a neural logic network may automatically be adapted to satisfy the logic function dictated by an adaptation signal indicated in FIG. 13 as $E_K$. The system includes a neural network of the type shown in FIG. 3, which includes three circuit neurons 100, 102 and 104, respectively similar to the neurons 12, 14 and 16 of FIG. 3. Four variable resistance devices, such as weighting element potentiometers 106, 108, 110 and 112 which are respectively similar to the potentiometers 38, 40, 42 and 44 of FIG. 3, are provided for selectively attenuating the inputs *w*, *x*, *y* and *z* to the third neuron 104. These inputs *w*, *x*, *y* and *z* are derived from the inhibitory and excitatory inputs A and B to the neurons 100 and 102 and from the excitatory and inhibitory outputs of the first and second neurons 100 and 102, as was explained in connection with FIG. 3. A source of voltage of value $E_{MAX}$, which may be supplied through a suitable isolating resistor, is also used and contributes to the input *y*. In the adaptive neural system of FIG. 13, the settings of the weighting element potentiometers 106, 108, 110 and 112 may be automatically controlled. For example, these potentiometers may be of the motor driven variety having a servo motor which controls the setting of the slider tap. Instead of the potentiometers, the signal responsive variable resistance devices, such as transfluxors, flexodes and the like, may be used. Control over the output of the neuron 104 is exercised by the settings of the weighting element potentiometers 106, 108, 110 and 112 and also by the inputs *w*, *x*, *y* and *z*, which are applied to the neuron 104 by way of these weighting element potentiometers. Control signals $C_w$, $C_x$, $C_y$ and $C_z$, which are used to derive connection signals which are a function of the inputs A and B and the error or difference between the actual and desired network outputs, and which respectively correspond to the inputs *w*, *x*, *y* and *z*, are obtained at the potentiometers 106, 108, 110 and 112. The control signal $C_w$ is therefore proportional to the difference between input B and input A, or $(B-A)$ when input B is greater than input A. When input A is greater than input B, $C_w$ does not appear.

The control signal output $C_x$, like the input *x*, is proportional to the input B when the input A is greater than input B and is proportional to the input A when the input B is greater than the input A.

$C_y$ is proportional to the difference between $E_{MAX}$ and the input A when input A is greater than input B, or $(E_{MAX}-A)$; and when input B is greater than input A, the control signal $C_y$ is proportional to the difference between $E_{MAX}$ and input B, or $(E_{MAX}-B)$.

Eight multiplier circuits 122, 124, 126, 128, 130, 132, 134 and 136, which may be of the type known in the art for multiplying two analog signals and providing an output related to the product of these two signals, are provided. A suitable multiplier circuit may include an amplifier having a logarithmic transfer characteristic so that the output of the amplifier is proportional to the product of the input signals on a logarithmic basis. Another suitable multiplier may be of the type described in United States Patent No. 3,018,046, for "Computing Device," issued to Arthur L. Vance, on January 23, 1962.

The multipliers operate in pairs and different pairs of the multipliers receive different ones of the control signals as inputs thereto. Thus, the control signal $C_w$ is applied to the multipliers 122 and 124; the control signal $C_x$ to the multipliers 126 and 128; the control signal $C_y$ to the multipliers 130 and 132; and the control signal $C_z$ to the multipliers 134 and 136. The other inputs to the multipliers are error signals which are related to the differences between the output of the neural network ($E_0$) which is obtained from the neuron 104 and the adaptation signal $E_K$.

These error signals are derived by means of three circuit neurons 138, 140 and 142, which may be similar to the other circuit neurons used in the system of FIG. 13. The first of these neurons 138 provides excitatory and inhibitory output signals equal to the adaptation signal $E_K$. The inhibitory $E_K$ output signal is subtracted from the network output signal $E_0$ in the neuron 140 and an error signal output is obtained from that neuron 140 when the network output signal $E_0$ is greater than the adaptation signal $E_K$. The inhibitory output signal $E_0$ is subtracted from the excitatory output signal $E_K$ in the neuron 142 and an output is obtained from that neuron 142 when the adaptation signal is greater than the network output signal. When the adaptation signal $E_K$ is equal to the network output signal $E_0$, no output is obtained from either of the neurons 140 or 142. The latter will be the case when the adaptation signal equals the network output signal and the network is adapted to provide the requisite output.

The error signal from the neuron 140 and the error signal from the neuron 142 are applied to different multipliers of each pair of multipliers. Thus, the multipliers 122, 126, 130 and 134 provide outputs when the output signal $E_0$ is greater than the adaptation signal $E_K$. The resulting output of these multipliers is a correction signal which will tend to reduce the contributions of the input signals to the excitation of the third neuron 104 of the network. Accordingly, the outputs of the multipliers 122, 126, 130 and 134 are labelled $-\Delta w$ and $-\Delta x$, $-\Delta y$ and $-\Delta z$, respectively. The other multipliers 124, 128, 132 and 136 provide outputs which are the product of the control signals and the output of the neuron 142, which occurs when the adaptation signal $E_K$ is greater than the network output signal $E_0$. Accordingly, these multipliers provide correction signals which tend to increase the contribution of their respective inputs in exciting the third neuron 104. Thus, the output signals of the multipliers 124, 128, 132 and 136 are respectively labelled $+\Delta w$, $+\Delta x$, $+\Delta y$ and $+\Delta z$.

The correction signals $+\Delta w$ and $-\Delta w$ are applied to a *w* control unit 144 which controls the setting of the weighting element potentiometer 106 which attenuates the *w* input signal. This control unit may include a difference amplifier which provides an output voltage to the servo motor of the potentiometer 106 and causes the potentiometer to move to the setting dictated by the polarity and magnitude output voltage of the *w* control unit 144. Other signal responsive elements for controlling the setting of the motor controlled potentiometer or similar servo device may alternatively be used. An *x* control unit 146, a *y* control unit 148, and a *z* control unit 150, all similar to the *w* control unit 144, may respectively be responsive to the *x* correction signals, *y* correction signals, and *z* correction signals, and provide outputs for the setting of the weighting element potentiometers 108, 110 and 112.

The control signals $C_w$, $C_x$, $C_y$ and $C_z$ are measures of the contribution and therefore the effectiveness of the inputs *w*, *x* and *z* in providing the output $E_0$ of the network. The equations for the output of the network are:

$$E_0=xB+(E_{MAX}-A)y+z(A-B)$$

when A is greater than B, and $$E_0=xA+(E_{MAX}-B)y+w(B-A)$$

when B is greater than A.

When, in the course of adaptation, the network output $E_0$ disagrees with the adaptation signal $E_K$, a correction may be effected by adjusting the weighting element potentiometers in proportion to the relative significance of the input signals in contributing to the undesired result. The relative significance of the inputs *w*, *x*, *y* and *z* is indicated by the relative magnitude of the control signals $C_w$, $C_x$, $C_y$ and $C_z$. Multiplication of the control signals by the error signals in the multipliers 122, 124, 126, 128, 130, 132, 134 and 136 effectively provides correction signals which are a measure of the relative significance of the control signals and which also indicate the sense of the requisite changes in the effectiveness of the inputs *w*, *x*, *y* and *z*.

In operation, the control units change the settings of the potentiometer in accordance with the correction signals, and, as the potentiometer settings change, the effectiveness of the inputs *w*, *x*, *y* and *z* on the network output changes. (Therefore, the network converges in time to achieve the response dictated by the adaptation signal. The system of FIG. 3 is therefore self-organizing in that its internal operations organize themselves to achieve a desired output.

The adaptation system of FIG. 13 may be used to provide a desired response characteristic, such as the characteristic illustrated in FIG. 12–*b*. Known input signals A and B may be applied to the network together with an adaptation signal $E_K$ which is equal to the desired output for the known inputs. The system then organizes itself to provide an output equal to the known output.

The system of FIG. 14 may be used for pattern recognition wherein the features of the pattern may be represented by a plurality of outputs A, B, C, D . . . $N-1$ and N of a feature abstraction system 154. This feature abstraction system 154 may, for example, in a visual pattern recognition system, include photoelectric devices for scanning a pattern, for example, representing an alphanumeric character to derive outputs representing lengths and direction of lines, intersections, and curves. In a speech analysis system, the feature abstraction system may include the frequency selective filters and associated apparatus for detecting the maxima, minima, slopes and other spectral characteristics of the speech pattern. A first level 156 of adaptive neural networks is provided. In this level, individual neural networks, only three of which 158, 160 and 162 are shown, are provided for each pair of outputs from the feature abstraction system. Adaptation inputs are provided for each of these adaptive neural networks 158, 160 and 162 to which adaptation signals may be applied. A second level 164 of neural networks is provided including a plurality of adaptive neural networks, two of which 166 and 168 are illustrated, which receive inputs from the outputs of different pairs of the neural network in the first level of networks 156. Inputs for adaptation signals are provided in each of the neural networks of the second level 164. Further levels of neural networks may be used, each with successively fewer neural networks. A final level 170 includes a single neural network 172, also having an input for adaptation signals indicated as adaptation input $1^n$. The neural networks in the various network levels are in a pyramidal array. The networks may be adapted by applying adaptation signals to their adaptation inputs, which adaptation signals may be derived from the outputs of the neural networks of a similar, master system when inputs derived from known patterns are applied thereto. Accordingly, when the features abstraction system 154 provides unknown inputs to the pyramidal array of networks in the system illustrated in FIG. 14, the final network 172 at the head of the pyramid provides an output which is a measure of the similarity of the unknown pattern to the known pattern. This output is an analog signal which indicates the probability of the unknown pattern being the known pattern.

From the foregoing description, it will be apparent that there have been provided improved neural networks and systems which are flexible in application and may be used to satisfy a wide range of neural logic functions. While the herein described neural networks and systems are particularly useful for recognizing visual, aural, and other patterns, other applications for the herein described networks and systems, as well as modifications and variations thereof, within the scope of the invention, will undoubtedly suggest themselves to those skilled in the art. Therefore, the foregoing description should be taken as illustrative and not in any limiting sense.

What is claimed is:

1. In a neural network, the combination comprising
(a) at least three circuit neurons,
each for producing one output having a value which is a function of the amount by which the input or inputs to that neuron exceed the threshold of that neuron and
for producing also a second output of an opposite sense to said one output, and
(b) means responsive to
(1) inputs to two of said neurons,
(2) signals of opposite sense to said inputs, and
(3) the outputs of said two neurons for applying inputs to the third neuron.

2. A neural network comprising
(a) at least three circuit neurons, each providing an excitatory output having a value which is a function of the amount by which the input or inputs to said neuron exceed a given threshold and also an inhibitory output of opposite sense to said excitatory output,
(b) means for separately applying different inputs of one sense to two of said neurons,
(c) means for separately applying to each of said two neurons a signal, equal in value and opposite in sense to the one of said different inputs which is applied to the other of said two neurons, and
(d) means responsive to
(1) selected quantities of the inputs of said two neurons,
(2) said signals equal in value and opposite in sense to said last-named inputs, and
(3) both the excitatory outputs and inhibitory outputs of said two neurons for applying inputs to the third of said neurons.

3. A neural network comprising
(a) at least three circuit neurons, each responsive to input signals and each producing output signals when said input signals thereto exceed a given threshold, which output signals have a maximum value for input signals of greater than a certain value,
(b) means for exciting a first and a second of said neurons separately, each with different input signals respectively representing different events,
(c) a source of a signal of greater than said certain value, and
(d) means responsive to variable amounts of a plurality of signals, each of which is a different function of said input signals to said first and second neurons and said output signals therefrom for applying input signals to said third neuron.

4. A neural network for providing an output which is an analog function of two quantities and which, at extreme values of said quantities, is the analog equivalent of any of a plurality of Boolean logic functions of said quantities, said network comprising
(a) at least three circuit neurons responsive to excitatory signals of one sense and providing, when said excitatory input signals exceed a given threshold, excitatory and inhibitory output signals of respectively said one sense and of a sense opposite to said one sense, which excitatory and inhibitory output signals have values which are a function of the amount by which said excitatory input signals exceed said threshold,
(b) means for separately exciting a first and a second of said neurons with input signals which are functions of different ones of said two quantities, and
(c) means for selectively exciting said third of said neurons in accordance with at least one of four input signals, each of which is a function of a different combination of
(1) the excitatory and inhibitory output signals of said first and second neurons,
(2) said input signals to said first and second neurons, and
(3) signals which are of equal value and opposite sense to said input signals to said first and second neurons whereby the output signals from said third neuron is the said analog function of said two quantities.

5. A neural network for providing an output which is an analog function of two quantities and which, at the extreme values of said quantities, is the analog equivalent of any of a plurality of Boolean logic functions of said quantities, said network comprising
(a) at least three circuit neurons responsive to excitatory signals of one sense and providing, when said excitatory input signals exceed a given threshold, excitatory and inhibitory output signals of respectively said one sense and of a sense opposite to said one sense, which excitatory and inhibitory output signals have values which are a function of the amount by which said excitatory input signals exceed said threshold,
(b) means for separately exciting a first and a second of said neurons with input signals which are functions of different ones of said two quantities, and
(c) means for exciting a third of said neurons in accordance with selected amounts of four input signals, each of which is the function of the sum of a different combination of (1) the excitatory and inhibitory outputs of said first and second neurons, (2) said input signals of said first and second neurons, and (3) signals which are of equal value and opposite sense to said input signals to said first and second neurons whereby the output signals from said third neuron is the said analog function of said two quantities.

6. An neural network for providing an output which is an analog function of two quantities and which, at the extreme values of said quantities, is the analog equivalent of any of a plurality of digital logic functions of said quantities, said network comprising (a) at least three circuit neurons responsive to excitatory signals of one sense and providing, when said excitatory input signals exceed a given threshold, excitatory and inhibitory output signals of respectively said one sense and of a sense opposite to said one sense, which excitatory and inhibitory output signals have values which are a function of how much said excitatory input signals exceed said threshold, (b) means for separately exciting a first and a second of said neurons with input signals which are respectively functions of a first and a second of said two quantities, (c) means for separately inhibiting said first and second neurons with input signals which respectively are functions of said second and said first of said two quantities, and (d) means for selectively exciting a third of said neurons in accordance with at least one of four input signals, each of which is a function of the sum of a different combination of (1) the excitatory and inhibitory output signals of said first and second neurons, (2) said excitatory input signals of said first and second neurons, and (3) said inhibitory input signals to said first and second neurons whereby the output signals from said third neuron is the said analog function of said two quantities.

7. A neural network comprising (a) a plurality of circuit neurons, each having a lower and an upper threshold and each producing a first output in response to inputs of one sense which exceed said lower threshold, which output increases with said inputs until said upper threshold is reached, said neurons each also having means for providing a second output equal to and of opposite sense to said first-named output, (b) means including two of said neurons responsive to a first input and a second input for deriving a plurality of outputs which respectively are functions of (1) the difference between said first input and said second input when said first input is greater than said second input, (2) the difference between said second input and said first input when said second input is greater than said first input, (3) said second input when said first input is greater than said second input, (4) said first input when said second input is greater than said first input, (5) the difference between the output produced when said upper threshold is reached and said first input when said first input exceeds said second input, and (6) the difference between the output produced when said upper threshold is reached and said second input when said second input exceeds said first input, and (c) means for applying to a third of said plurality of neurons, as inputs thereto, selected quantities of said plurality of outputs for deriving an output which is a continuously variable function of said first and second inputs which function includes the Boolean logic functions of said first and second inputs for the extreme values thereof.

8. A neural network comprising (a) a plurality of circuit neurons, each having a lower and an upper threshold and each producing excitatory and inhibitory outputs in response to an excitatory input which exceeds said lower threshold, which outputs increase in accordance with said input until said upper threshold is reached, (b) means for applying first and second inputs respectively representing first and second quantities to a first and a second of said plurality of neurons, (c) first, second, third and fourth weighting elements, (d) means including said first of said neurons and said first weighting element for deriving a first output which is a function of the difference between said first input and said second input when said first input is greater than said second input, (e) means including said second neuron and said second weighting element for deriving a second output which is a function of the difference between said second input and said first input when said second input is greater than said first input, (f) means including said first and second neurons and said third weighting element for deriving a third output which is a function of said first input when said second input is greater than said first input and is a function of said second input when said first input is greater than said second input, (g) means including said first and said second neurons and said fourth weighting element for providing a fourth output which is a function of the difference between the output produced when said upper threshold is reached and said first input when said first input is greater than said second input and also is a function of the difference between the output produced when said upper threshold is reached and said second input when said first input exceeds said second input, and (h) means for applying to a third of said plurality of neurons, as inputs thereto, selected quantities of said first, second, third and fourth outputs for deriving an output which is a continuously variable function of said first and second inputs, which function includes the Boolean logic functions of said first and second inputs for the extreme values thereof.

9. A neural network comprising (a) three circuit neurons, each having a lower and an upper threshold and each producing excitatory and inhibitory outputs in response to excitatory inputs which exceed said lower threshold, which outputs increase with said excitatory inputs to a saturation value when said input exceeds said upper threshold, (b) means for applying first and second inputs to a first and a second of said neurons so that said first input excites and inhibits said second and first neurons, respectively, (c) first, second, third and fourth weighting elements, each providing a variable output, (d) means for applying the excitatory output of said first neuron to said first weighting element, (e) means for applying the excitatory output of said second neuron to said second weighting element, (f) means for applying the inhibitory output of said first and second neurons and said first and second excitatory inputs to a third of said weighting elements, (g) means for applying the inhibitory outputs of said first and second neurons, said first and second inhibitory inputs, and a signal equal in value to said saturation value to said fourth weighting element, and (h) means for applying said outputs from said first, second, third and fourth weighting elements as inputs to a third of said neurons for mutually exciting said third neuron to provide an output which is a continuous function of said first and second inputs, which function varies with variations in the value of said weighting elements and which function includes the Boolean logic functions of said first and second inputs for the extreme values thereof.

10. In a neural network, the combination comprising (a) at least three circuit neurons, (1) each for producing a first output having a value which is a function of the amount by which the input or inputs to that neuron exceed the threshold of that neuron, and (2) for producing also a second output of an opposite sense to said first output, and (b) means responsive to inputs to two of said neurons and to both the outputs of both said two neurons for applying inputs to the third neuron.

11. In a neural network, the combination comprising (a) at least three circuit neurons, (1) each for producing a first analog output having a value which is a function of the amount by which the input or inputs to that neuron exceed the threshold of that neuron, and (2) for producing also a second analog output of an output of an opposite sense to said first output, and (b) means responsive to inputs to two of said neurons, and to the outputs of said two neurons for selectively applying at least one input to the third of said neurons.

12. A neural network comprising (a) at least three circuit neurons, each providing an output having a value which is a function of the amount by which the input or inputs to said neuron circuit exceed a given threshold, (b) means for separately applying different inputs to two of said neurons, and (c) means responsive to (1) selected quantities of the inputs to said two neurons, (2) the outputs of said two neurons, and (3) signals equal in amplitude and opposite in sense to the outputs of said two neurons for applying inputs to the third of said neurons.

13. A neural network comprising (a) at least three circuit neurons, each providing an excitatory output having a value which is a function of the amount by which the input or inputs to said neuron exceed a given threshold and also an inhibitory output of opposite sense to said excitatory output, (b) means for separately applying different inputs of one sense to two of said neurons, (c) means for separately applying to each of said two neurons a signal equal in value and opposite in sense to the one of said different inputs which is applied to the other of said two neurons, and (d) means responsive to selected quantities of each of said different inputs to said two neurons and of both the excitatory outputs and inhibitory outputs of said two neurons for applying inputs to the third of said neurons.

14. A neural network comprising (a) a plurality of circuit neurons, each producing a pair of outputs respectively of opposite sense when excited by input signals of one sense which exceed both a certain threshold and any input signals of opposite sense, (b) first and second of said neurons being responsive to first and second input signals and both providing output signals which are variable through a range from signals of one value and of one sense to signals of value equal to said one value and of the opposite sense, and (c) means responsive to said outputs from said first and second neurons and to said first and second inputs for applying inputs to a third of said neurons whereby to excite said third neuron to provide an output which is a continuously variable function of said first and second inputs.

15. A neural network comprising (a) a plurality of circuit neurons, each producing a pair of outputs respectively of opposite sense when excited by input signals of one sense which exceed a certain threshold and also exceed input signals of opposite sense, (b) means for applying inputs representing first and second quantities to a first and second of said plurality of neurons, weighting means responsive to selected, corresponding amounts of both said opposite sense outputs of said first and second neurons for applying variable inputs to a third of said plurality of neurons, and (c) weighting means respectively responsive to said inputs to said first and said second neurons for providing variable inputs to said third neuron whereby said third neuron provides an output which is a continuously variable function of said inputs to said first and second neurons.

16. A neural network comprising (a) a plurality of circuit neurons, each producing excitatory and inhibitory outputs when excited by excitatory inputs which exceed a certain threshold and any inhibitory input signals which are applied thereto, (b) means responsive to a first input for exciting a first of said plurality of neurons and for partially inhibiting a second of said plurality of neurons, (c) means responsive to a second input for exciting a second of said plurality of neurons and partially inhibiting said first neuron, (d) a pair of ganged potentiometers respectively connected between the excitatory and inhibitory outputs of said first and second neurons, (e) a first variable resistance element for applying variable amounts of said first input to a third of said plurality of neurons for exciting said third neuron, (f) a second variable resistance element for applying variable amounts of said second input to said third neuron for exciting said third neuron, and (g) means for also applying the outputs of said potentiometers to said third neuron for exciting and inhibiting said third neuron respectively in accordance with the position thereof, whereby said third neuron provides an output which is a continuous function of said first and second inputs, which function depends upon the settings of said potentiometers and said variable resistance elements.

No references cited.

ROBERT C. BAILEY, *Primary Examiner.*

G. D. SHAW, *Assistant Examiner.*